(12) United States Patent  (10) Patent No.: US 7,540,368 B2
Weiser  (45) Date of Patent: Jun. 2, 2009

(54) TRANSVERSE-ROLLER BELTS AND MODULES

(75) Inventor: David C. Weiser, River Ridge, LA (US)

(73) Assignee: Laitram, L.L.C., Harahan, LA (US)

( * ) Notice: Subject to any disclaimer, the term of this patent is extended or adjusted under 35 U.S.C. 154(b) by 86 days.

(21) Appl. No.: 11/742,614

(22) Filed: May 1, 2007

(65) Prior Publication Data

US 2008/0271978 A1  Nov. 6, 2008

(51) Int. Cl.
*B65G 17/06* (2006.01)
*B65G 17/24* (2006.01)

(52) U.S. Cl. .................. 198/370.09; 198/779; 198/853

(58) Field of Classification Search .............. 198/370.9, 198/779, 853
See application file for complete search history.

(56) References Cited

U.S. PATENT DOCUMENTS

| | | | | |
|---|---|---|---|---|
| 2,554,038 A | * | 5/1951 | Lemmon | ..................... 198/779 |
| 3,550,756 A | | 12/1970 | Kornylak | |
| 4,231,469 A | | 11/1980 | Arscott | |
| 4,880,107 A | * | 11/1989 | Deal | .......................... 198/779 |
| 5,261,525 A | * | 11/1993 | Garbagnati | .................. 198/779 |
| 6,029,802 A | * | 2/2000 | Musiari et al. | .............. 198/852 |
| 6,044,956 A | | 4/2000 | Henson et al. | |
| 6,318,544 B1 | | 11/2001 | O'Connor et al. | |
| 6,367,616 B1 | * | 4/2002 | Lapeyre et al. | ............... 198/779 |
| 6,398,015 B1 | | 6/2002 | Sedlacek et al. | |
| 6,494,312 B2 | | 12/2002 | Costanzo | |
| 6,568,522 B1 | | 5/2003 | Boelaars | |
| 6,758,323 B2 | * | 7/2004 | Costanzo | ............... 198/457.02 |
| 6,827,198 B1 | | 12/2004 | Costanzo | |
| 6,997,306 B2 | | 2/2006 | Sofranec et al. | |
| 6,997,309 B2 | | 2/2006 | Stebnicki et al. | |
| 7,137,505 B2 | | 11/2006 | Stebnicki et al. | |
| 7,147,097 B2 | | 12/2006 | Lemm | |
| 7,234,587 B2 | * | 6/2007 | Fandella | ...................... 198/779 |
| 7,357,245 B2 | * | 4/2008 | Lee | ............................ 198/778 |
| 2004/0129539 A1 | * | 7/2004 | Corley et al. | ................. 198/853 |
| 2005/0269189 A1 | * | 12/2005 | Rau et al. | .................... 198/779 |

* cited by examiner

*Primary Examiner*—Mark A Deuble
(74) *Attorney, Agent, or Firm*—James T. Cronvich

(57) ABSTRACT

A modular roller-top conveyor belt with a dense array of rollers freely rotatable toward the sides of the belt. The rollers are arranged in offset lines and columns in a checkerboard pattern on the top side of the belt. The rollers rotate on axes parallel to the direction of belt travel. The rollers extend in the direction of belt travel over the hinge axes formed between adjacent rows of belt modules.

25 Claims, 4 Drawing Sheets

US 7,540,368 B2

TRANSVERSE-ROLLER BELTS AND MODULES

BACKGROUND

The invention relates generally to power-driven conveyor belts and, more particularly, to modular conveyor belts having article-supporting rollers arranged to rotate on axes in the direction of belt travel.

Roller belts having article-supporting rollers arranged to rotate freely on axes in the direction of belt travel are often used to convey articles, especially high-friction articles such as tires. The freely rotatable rollers make it easy to slide articles onto and off the belt from the sides. Modular roller-top conveyor belts constructed of rows of roller-top belt modules connected in series at hinge joints are used in many conveying applications. In these belts, the rollers are arranged at the top sides of the belt rows between the hinge joints, forming a gap in the roller arrangement along each hinge joint. Small articles or articles presenting a base with small dimensions to the supporting rollers can get caught in the gap. Unlike cured tires, which present an entire sidewall as a base to a conveyor belt, uncured, or "green," tires present only a narrow circular bead as a base to a conveyor belt. The narrow bead can get caught in the roller gap at the hinge joints of conventional roller-top belts.

SUMMARY

These shortcomings are overcome and other advantages are provided by a conveyor belt embodying features of the invention. In one aspect, the conveyor belt comprises a series of rows of one or more belt modules connected together at hinge joints. Each row of modules extends longitudinally in a direction of belt travel between a first end and a second end, laterally between a first side edge and a second side edge, and in thickness between a top side and a bottom side. The hinge joints define laterally disposed hinge axes. Rollers having axles aligned in the direction of belt travel are supported at the top side of the conveyor belt. The axles define longitudinal axes of rotation for the rollers. Some of the rollers in a row of belt modules extend over the hinge axis at the first end of the row.

In another aspect, the modular conveyor belt has roller supports upstanding from the top side of the belt. Rollers supported in the roller supports are arranged to rotate towards the first and second side edges of the belt. Some of the rollers are positioned above the hinge axes so that a plane containing one of the hinge axes and perpendicular to another plane containing both of the hinge axes of a belt row intersects the rollers above the hinge axis.

In yet another aspect of the invention, a conveyor belt module comprises a first end and an opposite second end defining the module's length, opposite first and second side edges defining its width, and opposite top and bottom sides defining its thickness. A first set of aligned hinge elements and a second set of aligned hinge elements are spaced apart across the width of the module at the first and second ends. The aligned hinge elements define first and second hinge axes, which define a first plane. Rollers are supported at the top side of the module for rotation toward the first and second side edges. Some of the rollers intersect a second plane perpendicular to the first plane and intersecting the first hinge axis.

BRIEF DESCRIPTION OF THE DRAWINGS

These features and aspects of the invention, as well as its advantages, are better understood by referring to the following description, appended claims, and accompanying drawings, in which:

DETAILED DESCRIPTION

Figure 1:
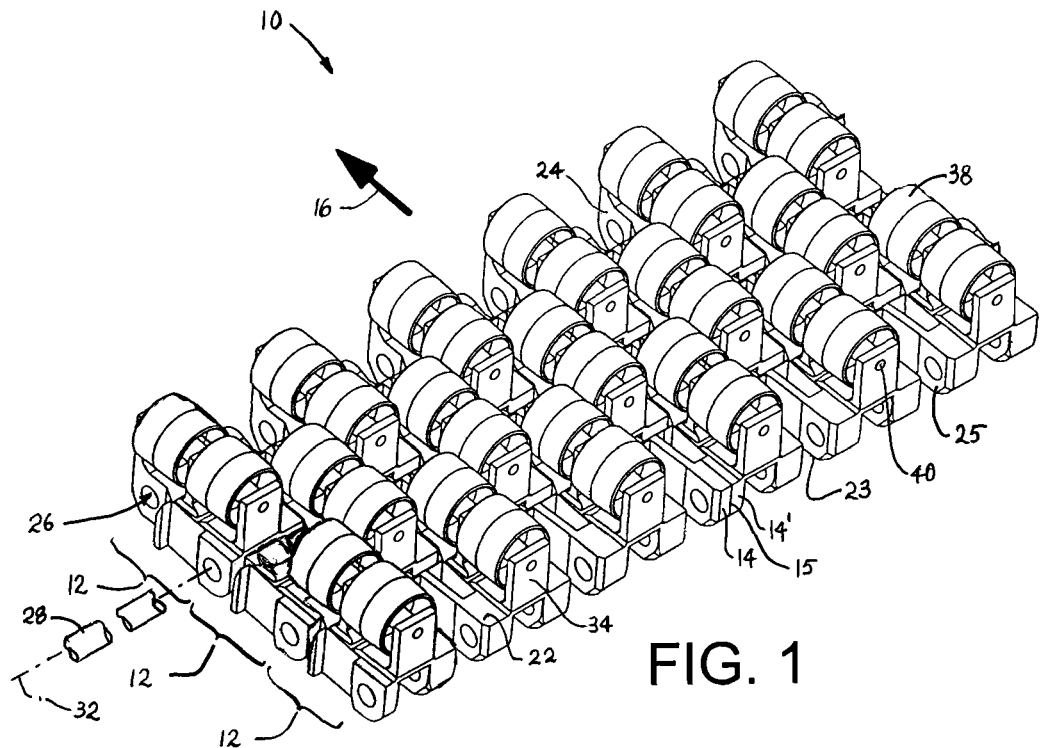
FIG. 1 is an isometric view of a portion of one version of a conveyor belt embodying features of the invention.

A portion of one version of a conveyor belt embodying features of the invention is shown in FIGS. 1-4. The portion of the belt 10 shown includes three rows 12 of a single belt module or side-by-side belt modules 14, 14' separated at a seam 15. Each row extends in length longitudinally (in the direction of belt travel 16) from a first end 18 to a second end 19, laterally (in a width direction) from a first side edge 20 to an opposite second side edge 21 and in thickness from a top side 22 to a bottom side 23. Hinge elements, in the form of hinge eyes 24, 25 in this example, are spaced apart laterally along the first and second ends of each row. The hinge eyes at the first end of a row are interleaved with the hinge eyes at the second end of an adjacent row. Aligned openings 26 in the interleaved hinge eyes form a lateral passageway between rows. A hinge pin 28 received in the passageways connects adjacent modules together at hinge joints 30 defining a hinge axis 32 about which adjacent rows can pivot to allow the belt to articulate about drive or diverting elements such as sprockets, drums, shoes, or return rollers.

Upstanding from the top side 22 of the belt modules are groups of three supports 34, 35, 36 for rollers 38. The end supports 34, 36 stand up from the hinge eyes at the first and second ends of each module. The middle support 35 stands up from the middle of the module. The supports have aligned openings 40 that receive and support an axle 42. The rollers are mounted on the axles. In this example, a single roller is mounted between each pair of supports in each group of three. The roller axles are aligned in the direction of belt travel to allow the rollers to rotate freely toward the first and second side edges of the belt in a transverse-roller configuration.

Figure 2:
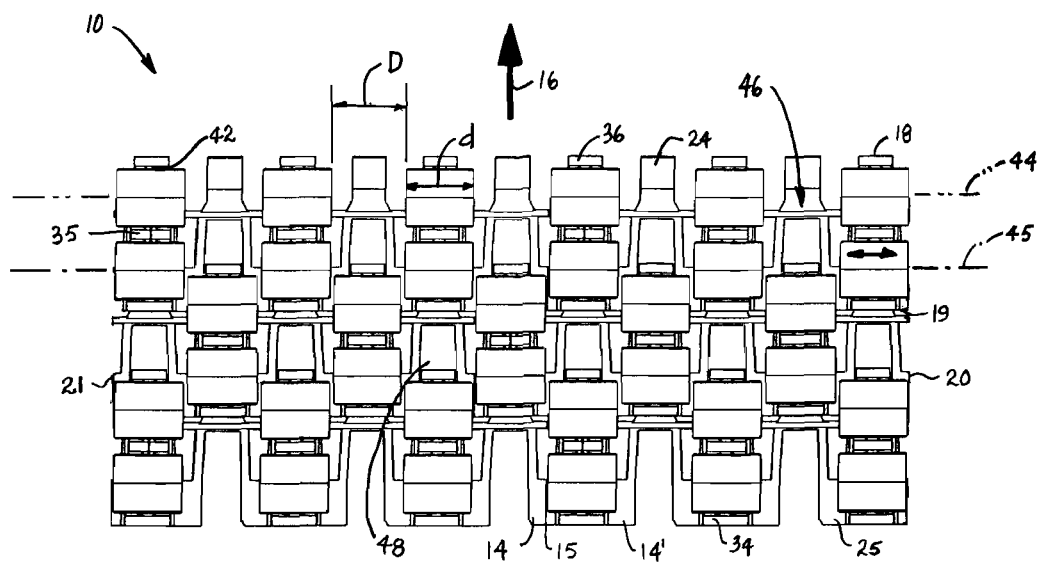
FIG. 2 is a top plan view of the conveyor belt of FIG. 1.
Figure 3:
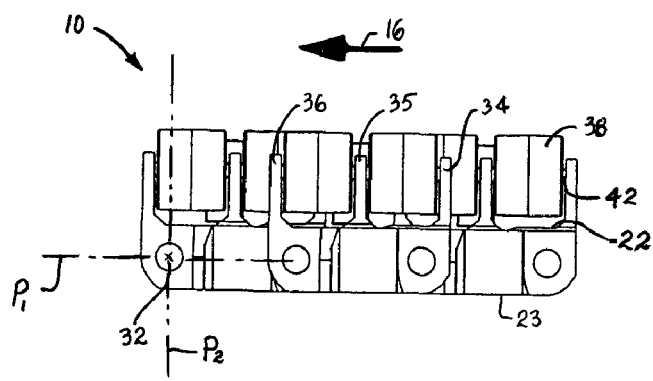
FIG. 3 is a side elevation view of the conveyor belt of FIG. 1.
Figure 4:
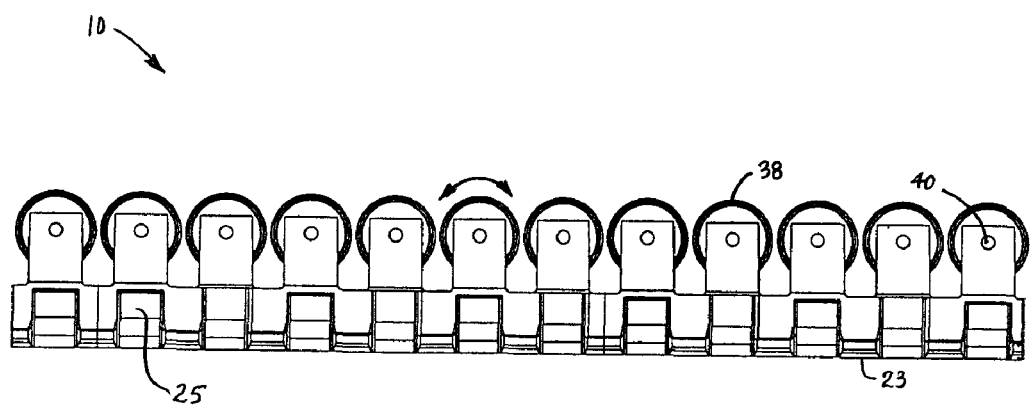
FIG. 4 is a front elevation view of the conveyor belt of FIG. 1.

As best shown in FIG. 2, two lateral lines 44, 45 of rollers are formed along each row. The rollers in each line are spaced apart laterally by a distance D slightly greater than the diameter d of the rollers. This allows the rollers in a row to nest closely with the laterally offset rollers of an adjacent row. As best shown in FIG. 3, the rollers 38 extend over the hinge axis 32 so that a plane $P_1$ defined by consecutive hinge axes intersects a plane $P_2$ perpendicular to $P_1$ through the hinge axis. Because the rollers extend over the hinge axis, they overlap portions of the interleaved hinge eyes of adjacent rows and fit into the gaps 46 between the laterally spaced sets of rollers. The result is a conveyor surface with an array of rollers arranged in lateral lines and offset longitudinal columns to form a checkerboard pattern with relatively minor voids 48 between the sets of rollers.

Figure 5:
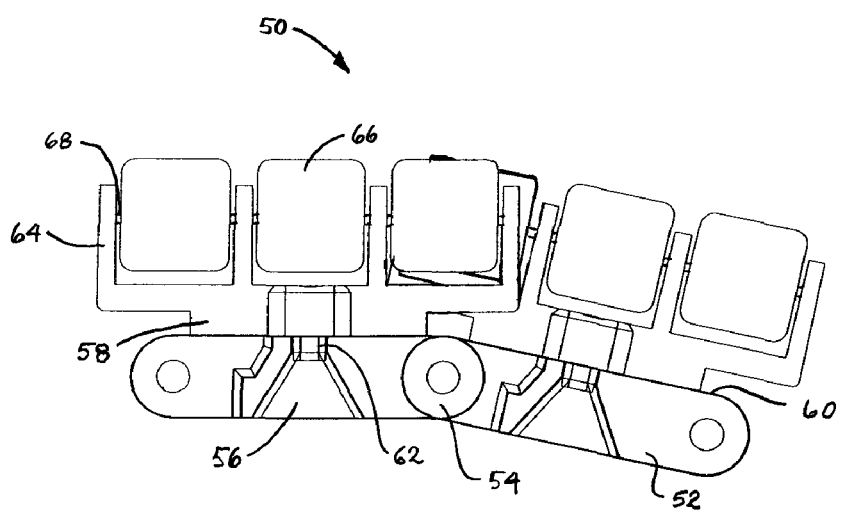
FIG. 5 is a side elevation view of another version of a conveyor belt embodying features of the invention, including three lines of rollers across the width of each module.

Another version of a belt having similar characteristics is shown in part in FIG. 5. This belt 50 is constructed of rows of modules 52 connected together at hinge joints 54 by hinge pins. Pockets 56 in the underside of the module receive teeth from drive and idle sprockets. A mounting base 58 is fastened to the top side 60 of each module by bolts, screws, or other fasteners retained in threaded holes 62 or inserts in the top side of the module. Rollers supports 64 extend upward from the mounting base to support a set of three rollers 66 for rotation on an axle or axles 68 parallel to the direction of belt travel 16. Like the rollers in the configuration of FIGS. 1-4, the rollers in FIG. 5 extend over the hinge axes to overlap longitudinally with the laterally offset rollers on the adjacent belt rows.

Figure 7:
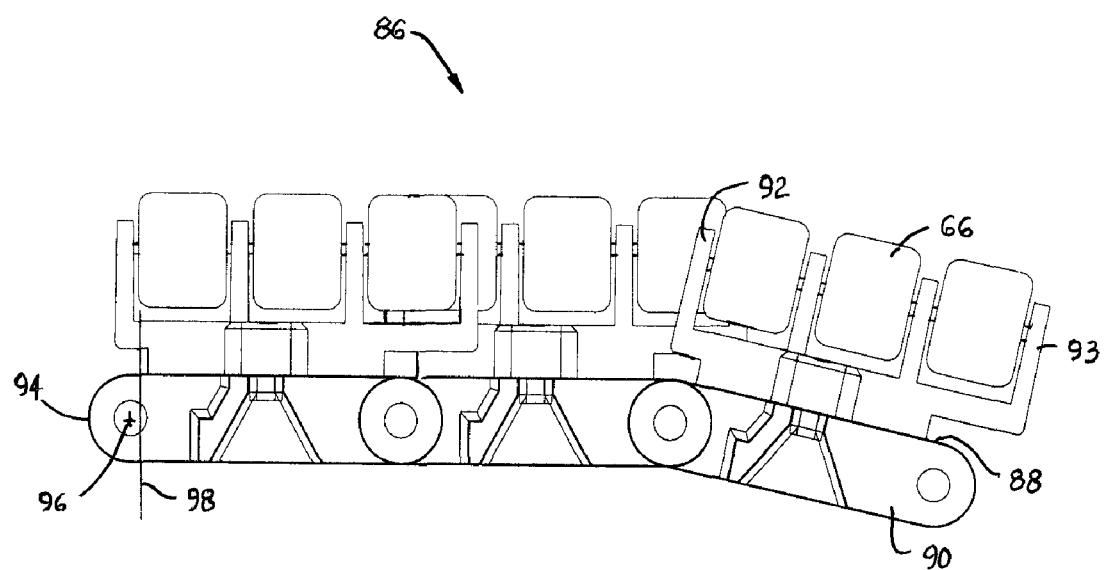
FIG. 7 is a side elevation view of a portion of yet another version of a conveyor belt embodying features of the invention, including rollers longitudinally offset from the rollers in the belt modules of FIG. 5.

A belt similar to the belt of FIG. 5 is shown in FIG. 7. In this belt 86, the rollers 66 are offset longitudinally along the top side 88 of each module 90 from the rollers in the belt 50 of FIG. 5. The roller supports 92, 93 are shifted longitudinally away from one end 94 of the row of modules. In this way, the rollers do not extend over the hinge axis 96 at that end of the row of belt modules, as indicated by the line 98 extending downward from the extreme end of the roller in FIG. 7.

Figure 6:
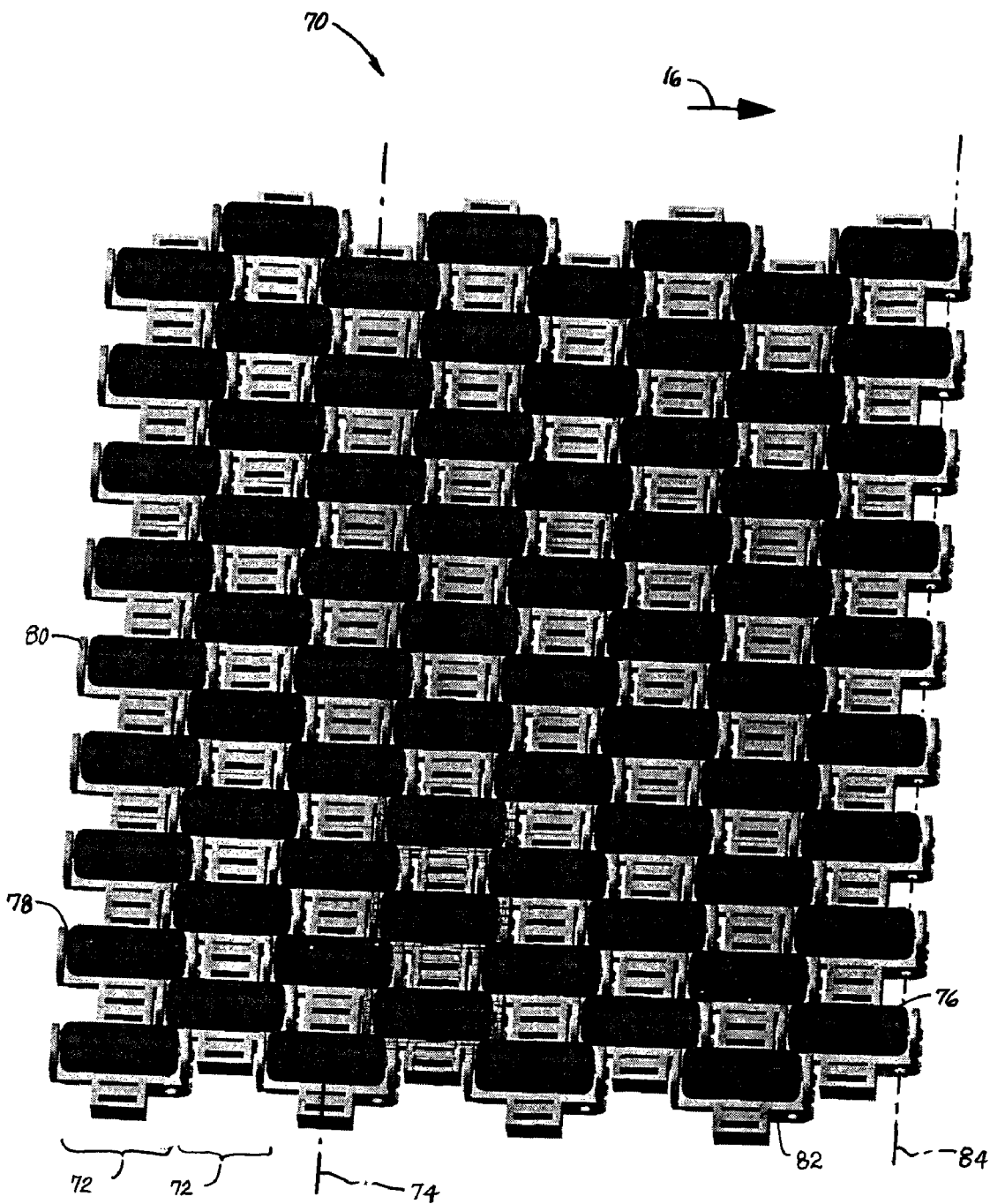
FIG. 6 is a pictorial view of an interior portion of yet another version of a conveyor belt embodying features of the invention, including a single line of rollers across the width of each module.

The interior portion of a belt having a single line of rollers per row is shown in FIG. 6. In the belt 70, each row 72 has a single lateral line 74 of rollers 76. The rollers rotate on axles 78 aligned in the direction of belt travel 16. The ends of the axles are supported in roller supports 80 upstanding from the top surface 82 of the belt. The rollers extend over the hinge axes 84 so that they overlap the rollers in an adjacent row. Like the other versions, the belt shown in FIG. 6 eliminates a significantly wide gap at the hinge joint between lateral lines of rollers that are freely rotatable toward the side edges of the belt.

Although the invention has been described with reference to a few preferred versions, other versions are possible. As one example, there could be multiple individual rollers between consecutive roller supports. As another example, the belts depicted are modular plastic conveyor belts, but could be modular metal or ceramic belts as well. As still another example, the axles may be non-rotating and extend through bores in the rollers or could be stubs that protrude from the sides of the rollers to rotate in receptacles in the supports. So, as these few examples suggest, the claims are not meant to be limited to the preferred versions described in detail.

What is claimed is:

1. A conveyor belt comprising:
a plurality of rows of one or more belt modules, each row extending longitudinally in a direction of belt travel between a first end and a second end, laterally between a first side edge and a second side edge, and in thickness between a top side and a bottom side, wherein the rows are hingedly connected together first end to second end at hinge joints each defining a laterally disposed hinge axis allowing the conveyor belt to articulate;
a plurality of rollers supported at the top side of each row, the rollers having axles aligned in the direction of belt travel defining longitudinal axes of rotation for the rollers;
wherein at least some of the rollers in a row of belt modules extend over the hinge axis at the first end of the row.

2. A conveyor belt as in claim 1 comprising a plurality of roller supports upstanding from the top side of the rows to support the roller axles.

3. A conveyor belt as in claim 2 wherein each of the rollers is supported between a longitudinally spaced pair of the roller supports.

4. A conveyor belt as in claim 2 further including a mounting base fastened to the top side of a row and wherein the roller supports extend from the mounting base.

5. A conveyor belt as in claim 1 wherein the rollers are arranged in a checkerboard pattern.

6. A conveyor belt as in claim 1 wherein each row includes a single lateral line of rollers.

7. A conveyor belt as in claim 1 wherein each row includes a plurality of lateral lines of rollers.

8. A conveyor belt as in claim 7 wherein the rollers in a line are laterally offset from the rollers in an adjacent line.

9. A conveyor belt as in claim 1 wherein the rollers at the first end of a row are laterally offset from the rollers at the first end of an adjacent row.

10. A conveyor belt as in claim 1 wherein none of the rollers in a row extend over the hinge axis at the second end of the row.

11. A conveyor belt comprising:
a series of rows of one or more belt modules, each row extending longitudinally in a direction of belt travel between a first end and a second end, laterally between a first side edge and a second side edge, and in thickness between a top side and a bottom side, wherein the rows are hingedly connected together first end to second end at hinge joints defining laterally disposed hinge axes at each end of each row on which the conveyor belt articulates, wherein the hinge axes at opposite ends of a row define a first plane;
a plurality of roller supports upstanding from the top side of each row;
rollers supported in the roller supports and arranged to rotate toward the first and the second side edges;
wherein at least some of the rollers are positioned above the hinge axes so that a second plane perpendicular to the first plane through one of the hinge axes of the row intersects the rollers positioned above the hinge axes.

12. A conveyor belt as in claim 11 wherein each of the rollers is supported between a longitudinally spaced pair of the roller supports.

13. A conveyor belt as in claim 11 further including a mounting base fastened to the top side of a row and wherein the roller supports extend from the mounting base.

14. A conveyor belt as in claim 11 wherein the rollers are arranged in a checkerboard pattern.

15. A conveyor belt as in claim 11 wherein each row includes a single lateral line of rollers.

16. A conveyor belt as in claim 11 wherein each row includes a plurality of lateral lines of rollers.

17. A conveyor belt as in claim 16 wherein the rollers in a line are laterally offset from the rollers in an adjacent line.

18. A conveyor belt as in claim 11 wherein the rollers at the first end of a row are laterally offset from the rollers at the first end of an adjacent row.

19. A conveyor belt as in claim 11 wherein none of the rollers in a row extend over the hinge axis at the second end of the row.

20. A conveyor belt module comprising:
a first end and an opposite second end defining the length of the module;

a first side edge and an opposite second side edge defining the width of the module; and a top side and an opposite bottom side defining the thickness of the module;

a first set of aligned hinge elements spaced apart across the width of the module body along the first end to define a first hinge axis through the aligned hinge elements;

a second set of aligned hinge elements spaced apart across the width of the module body along the second end to define a second hinge axis through the aligned hinge elements;

wherein the first and second hinge axes define a first plane;

a plurality of rollers supported at the top side for rotation toward the first and second side edges;

wherein at least some of the rollers intersect a second plane perpendicular to the first plane through the first hinge axis.

21. A conveyor belt module as in claim 20 comprising a plurality of roller supports upstanding from the top side of the module to support the rollers.

22. A conveyor belt module as in claim 21 wherein each of the rollers is supported between a pair of the roller supports spaced apart in the length direction.

23. A conveyor belt module as in claim 21 further including a mounting base fastened to the top side of the module and wherein the roller supports extend from the mounting base.

24. A conveyor belt module as in claim 20 wherein each module includes a single line of rollers extending along the width of the module.

25. A conveyor belt module as in claim 20 wherein each module includes a plurality of lines of rollers extending along the width of the module and wherein the rollers in a line are offset in the width direction from the rollers in an adjacent line.

\* \* \* \* \*